United States Patent
Satake

(10) Patent No.: US 12,553,408 B2
(45) Date of Patent: Feb. 17, 2026

(54) FUEL SYSTEM LEAKAGE ANOMALY DETECTION DEVICE AND FUEL SYSTEM LEAKAGE ANOMALY DETECTION METHOD FOR INTERNAL COMBUSTION ENGINE

(71) Applicant: TOYOTA JIDOSHA KABUSHIKI KAISHA, Toyota (JP)

(72) Inventor: Nobuhiko Satake, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 333 days.

(21) Appl. No.: 18/538,757

(22) Filed: Dec. 13, 2023

(65) Prior Publication Data

US 2024/0200522 A1 Jun. 20, 2024

(30) Foreign Application Priority Data

Dec. 19, 2022 (JP) .................. 2022-202158

(51) Int. Cl.
*F02M 65/00* (2006.01)
*F02D 41/22* (2006.01)

(52) U.S. Cl.
CPC ..... *F02M 65/006* (2013.01); *F02D 2041/225* (2013.01); *F02M 2700/05* (2013.01)

(58) Field of Classification Search
CPC .................................................. F02M 65/006
See application file for complete search history.

(56) References Cited

U.S. PATENT DOCUMENTS

| 2010/0151343 | A1* | 6/2010 | Katano | ............. | H01M 8/04686 |
| | | | | | 429/444 |
| 2018/0233755 | A1* | 8/2018 | Saito | .................... | H01M 16/006 |
| 2021/0257634 | A1* | 8/2021 | Inoue | ...................... | G01M 3/26 |
| 2023/0378499 | A1* | 11/2023 | Toida | ................ | H01M 8/04395 |

FOREIGN PATENT DOCUMENTS

JP 2015-090076 A 5/2015

* cited by examiner

*Primary Examiner* — Eric S. McCall
(74) *Attorney, Agent, or Firm* — Finnegan, Henderson, Farabow, Garrett and Dunner, LLP

(57) ABSTRACT

A first pressure sensor is disposed in a first fuel system between a first shutoff valve and a second shutoff valve. A second pressure sensor is disposed in a second fuel system between the second shutoff valve and a fuel injection valve. A determination process determines a leakage anomaly in the first fuel system or the second fuel system based on a first magnitude relationship or a second magnitude relationship. The first magnitude relationship is a relationship between a detection value of the first pressure sensor in a state in which the first fuel system is filled with gaseous fuel and a first threshold value. The second magnitude relationship is a relationship between a detection value of the second pressure sensor in a state in which the second fuel system is filled with gaseous fuel and a second threshold value.

17 Claims, 8 Drawing Sheets

FUEL SYSTEM LEAKAGE ANOMALY DETECTION DEVICE AND FUEL SYSTEM LEAKAGE ANOMALY DETECTION METHOD FOR INTERNAL COMBUSTION ENGINE

BACKGROUND

1. Field

The present disclosure relates to an anomaly detection device for an internal combustion engine, an anomaly detection method for an internal combustion engine, and a storage medium.

2. Description of Related Art

Japanese Laid-Open Patent Publication No. 2015-90076 describes an internal combustion engine including a tank for storing gaseous fuel. Fuel injection valves inject the gaseous fuel. The fuel passage connecting the tank and the fuel injection valves includes a first shutoff valve, a second shutoff valve, and a pressure reducing valve arranged in that order from the upstream side. A pressure sensor is disposed in the fuel passage between the first and second shutoff valves. The detection value of the pressure sensor is used to detect any anomaly in the high-pressure piping portion and the first shutoff valve upstream of the pressure reducing valve.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an anomaly detection device for an internal combustion engine includes a control circuit. The control circuit is configured to perform a determination process for determining a leakage anomaly in a first fuel system or a second fuel system of a fuel supply device of the internal combustion engine. The fuel supply device includes a tank that stores gaseous fuel, a fuel injection valve that supplies fuel to a cylinder, a fuel passage that supplies the gaseous fuel in the tank to the fuel injection valve, a first shutoff valve disposed downstream of the tank in the fuel passage, a pressure reducing valve disposed downstream of the first shutoff valve in the fuel passage, a second shutoff valve disposed downstream of the pressure reducing valve in the fuel passage, a first pressure sensor disposed in the first fuel system, and a second pressure sensor disposed in the second fuel system. The first fuel system is a fuel system between the first shutoff valve and the second shutoff valve. The second fuel system is a fuel system between the second shutoff valve and the fuel injection valve, The determination process determines a leakage anomaly in the first fuel system or the second fuel system based on a first magnitude relationship in a state in which the first fuel system is filled with gaseous fuel, or on a second magnitude relationship in a state in which the second fuel system is filled with gaseous fuel. The first magnitude relationship is a magnitude relationship between a detection value of the first pressure sensor and a predetermined first threshold value. The second magnitude relationship is a magnitude relationship between a detection value of the second pressure sensor and a predetermined second threshold value.

According to the configuration, a pressure sensor is disposed in the first fuel system between the first shutoff valve and the second shutoff valve. Another pressure sensor is disposed in the second fuel system between the second shutoff valve and the fuel injection valve. If the first fuel system has a leakage anomaly or the second fuel system has a leakage anomaly, such anomaly appears in the detection values of these pressure sensors. The above configuration therefore performs the determination process described above. As such, it is possible to determine which of the first and second fuel systems has a fuel leakage anomaly based on the detection values of the pressure sensors and the predetermined threshold values.

Depending on the sealing state of the injection holes, that is, the valve holes of the fuel injection valves, which inject gaseous fuel, it is not always possible to seal the injection holes while the internal combustion engine is stopped. To reduce the amount of gaseous fuel leaking into the cylinders from the injection holes while the operation is stopped, the second shutoff valve described above can be placed between the fuel injection valves and the pressure reducing valve. In a fuel system including shutoff valves placed at such positions, it would be desirable to determine whether a section of the fuel system between the first shutoff valve and the second shutoff valve has a leakage anomaly, or a section of the fuel system between the second shutoff valve and the fuel injection valves has a leakage anomaly. However, such determination is difficult with the device of the above publication, which detects a leakage anomaly in the section of the fuel system upstream of the pressure reducing valve. The above configuration reduces such difficulties.

According to another aspect of the present disclosure, a method for detecting an anomaly of an internal combustion engine that includes the same processes as the various processes of the above anomaly detection device is provided.

According to yet another aspect of the present disclosure, a non-transitory computer-readable storage medium storing a program for causing a processer to perform the same processes as the various processes of the above anomaly detection device is provided.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Figure 1:
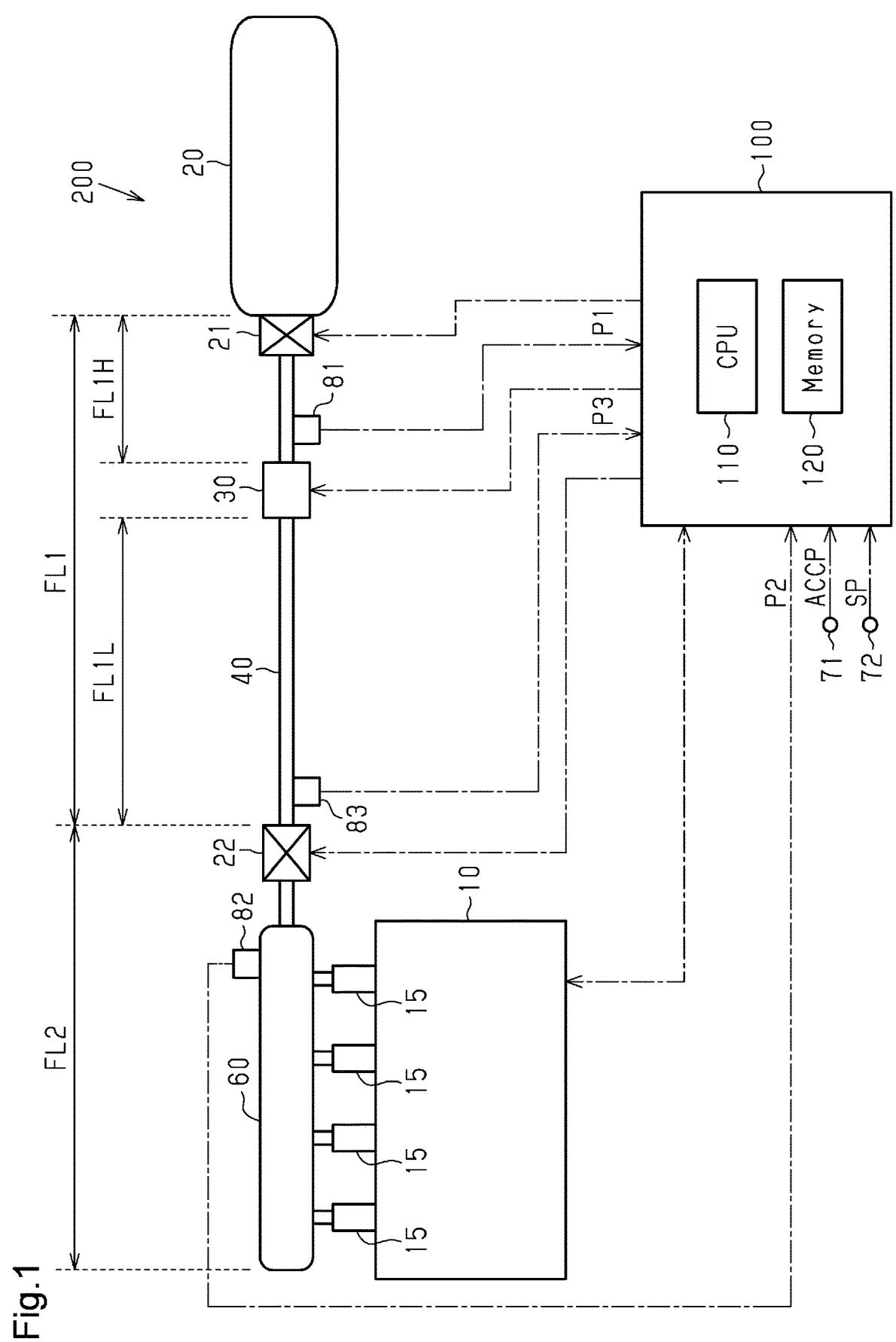
FIG. 1 is a schematic diagram showing a fuel system and a controller of an internal combustion engine according to a first embodiment.
Figure 2:
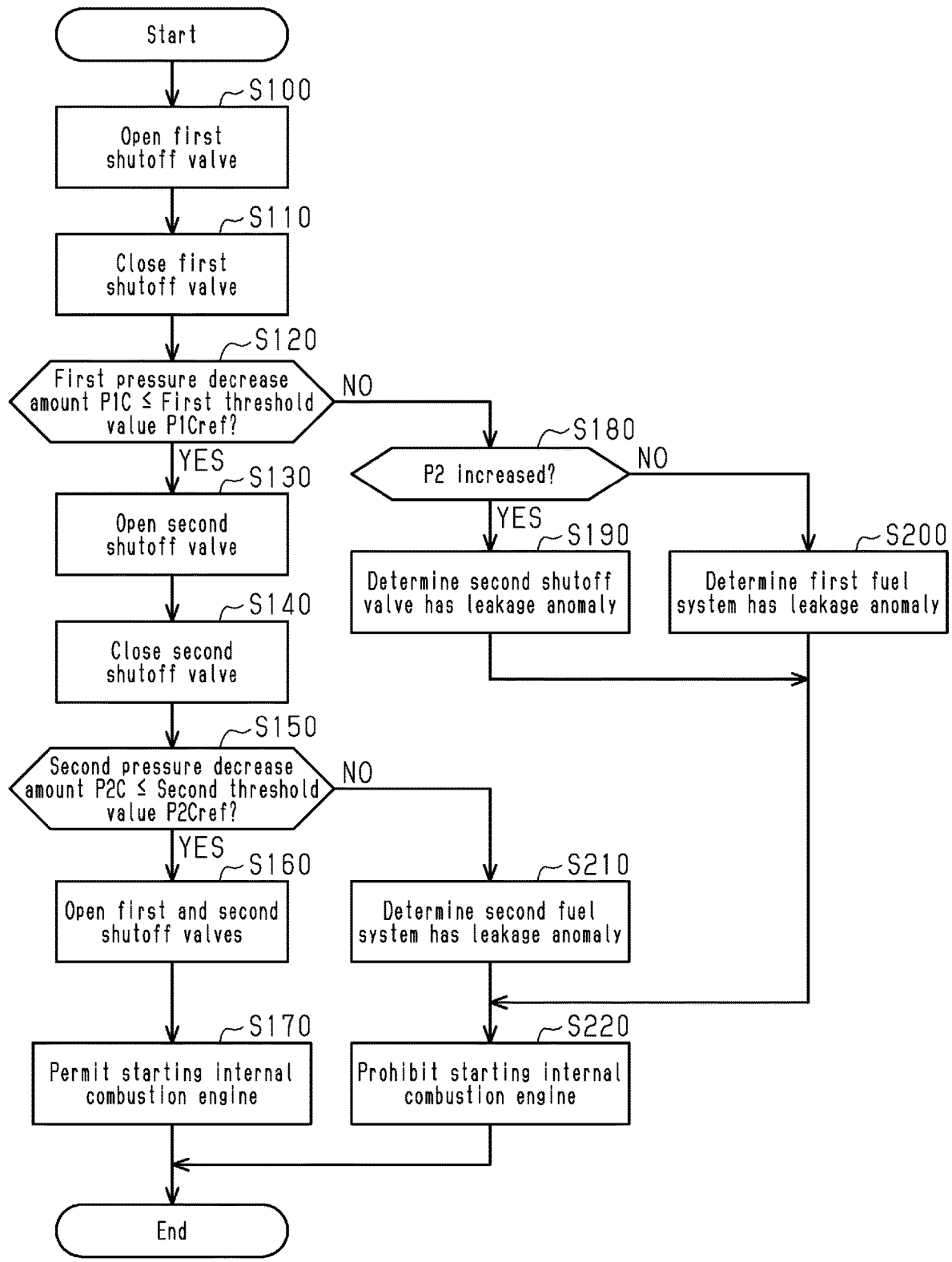
FIG. 2 is a flowchart showing a procedure of a determination process performed by the controller in FIG. 1.

Referring to FIGS. 1 and 2, an anomaly detection device, an anomaly detection method, and an anomaly detection process for an internal combustion engine according to a first embodiment are now described.

Fuel System and Controller of Internal Combustion Engine

FIG. 1 shows an internal combustion engine 10, which uses hydrogen gas, which is gaseous fuel, as fuel.

The internal combustion engine 10 includes a fuel supply device 200, which includes fuel injection valves 15, a tank 20, fuel piping 40, a first shutoff valve 21, a second shutoff valve 22, a pressure reducing valve 30, and a delivery pipe 60.

Each fuel injection valve 15 supplies fuel to a cylinder of the internal combustion engine 10.

The tank 20 stores hydrogen gas, which is a gaseous fuel, in a compressed state.

The fuel piping 40 is connected to the tank 20 and the delivery pipe 60.

The fuel injection valves 15 are connected to the delivery pipe 60.

The hydrogen gas stored in the tank 20 is supplied to the fuel injection valves 15 through the fuel piping 40 and the delivery pipe 60. That is, the fuel piping 40 and the delivery pipe 60 function as a fuel passage that supplies the gaseous fuel in the tank 20 to the fuel injection valves 15.

The first shutoff valve 21, the pressure reducing valve 30, and the second shutoff valve 22 are arranged in the fuel piping 40 in that order in the fuel flow direction, that is, from upstream to downstream.

The first shutoff valve 21 is a solenoid valve disposed near the outlet of the tank 20. When the first shutoff valve 21 is open, fuel is supplied from the tank 20 to the fuel piping 40. When the first shutoff valve 21 is in a closed state, the fuel supply from the tank 20 to the fuel piping 40 is stopped.

The pressure reducing valve 30 is a solenoid valve that adjusts the fuel pressure, which is the pressure of the hydrogen gas supplied to the fuel injection valves 15, to a pressure that corresponds to the operating state of the internal combustion engine 10.

The second shutoff valve 22 is a solenoid valve disposed near the delivery pipe 60. When the second shutoff valve 22 is open, fuel is supplied to the delivery pipe 60. When the second shutoff valve 22 is in a closed state, the fuel supply to the delivery pipe 60 is stopped. Closing the second shutoff valve 22 reduces the amount of fuel leaking into the cylinders from the injection holes of the fuel injection valves 15.

While the internal combustion engine 10 is not operating, the first and second shutoff valves 21 and 22 are maintained in a closed state. While the internal combustion engine 10 is operating, the first and second shutoff valves 21 and 22 are maintained in an open state.

Hereinafter, in the whole fuel system, the section between the first and second shutoff valves 21 and 22 is referred to as a first fuel system FL1. Specifically, the first fuel system FL1 includes the section of the fuel piping 40 upstream of the second shutoff valve 22.

In this first fuel system FL1, the section of the fuel piping 40 upstream of the pressure reducing valve 30 is referred to as an upstream first fuel system FL1H. The fuel pressure in this upstream first fuel system FL1H is yet to be reduced by the pressure reducing valve 30, and is therefore high.

In the first fuel system FL1, the section of the fuel piping 40 between the pressure reducing valve 30 and the second shutoff valve 22 is referred to as a downstream first fuel system FL1L. The fuel pressure in this downstream first fuel system FL1L is the fuel pressure after reduction by the pressure reducing valve 30, and is therefore lower than the fuel pressure in the upstream first fuel system FL1H.

In the whole fuel system, the section between the second shutoff valve 22 and the fuel injection valves 15 is referred to as a second fuel system FL2. This second fuel system FL2 includes the section of the fuel passage downstream of the second shutoff valve 22. That is, the second fuel system FL2 not only includes the delivery pipe 60, for example, but also includes the section of the fuel piping 40 that connects the delivery pipe 60 to the second shutoff valve 22.

The first fuel system FL1 includes a first pressure sensor 81 and a third pressure sensor 83.

The first pressure sensor 81 is an upstream pressure sensor disposed in the section of the fuel piping 40 between the first shutoff valve 21 and the pressure reducing valve 30, that is, in the upstream first fuel system FL1H. The first pressure sensor 81 detects a first pressure P1, which is the fuel pressure in the upstream first fuel system FL1H of the first fuel system FL1.

The third pressure sensor 83 is a downstream pressure sensor disposed in the section of the fuel piping 40 between the pressure reducing valve 30 and the second shutoff valve 22, that is, in the downstream first fuel system FL1L. The third pressure sensor 83 detects a third pressure P3, which is the fuel pressure in the downstream first fuel system FL1L of the first fuel system FL1.

The second fuel system FL2 includes a second pressure sensor 82. Specifically, the second pressure sensor 82 is disposed in the delivery pipe 60. As such, the second pressure sensor 82 detects a second pressure P2, which is the fuel pressure in the delivery pipe 60.

The controller 100 is a control circuit that performs various controls on fuel injection and the like of the internal combustion engine 10 by controlling various control targets such as the fuel injection valves 15, the first shutoff valve 21, the pressure reducing valve 30, and the second shutoff valve 22. The controller 100 includes a CPU 110 as a processor and a memory 120 including a ROM, a RAM, and the like. The controller 100 performs various controls by causing the CPU 110 to execute programs stored in the memory 120.

The controller 100 refers to various values necessary for controlling the internal combustion engine 10. For example, the controller 100 refers to the detection values of the first pressure sensor 81, the second pressure sensor 82, and the third pressure sensor 83. The controller 100 also refers to the detection signal of an accelerator position sensor 71, which detects the accelerator operation amount ACCP, which is the operation amount of the accelerator pedal operated by the driver of the vehicle in which the internal combustion engine 10 is installed. The controller 100 further refers to the detection signal of a speed sensor 72, which detects the vehicle speed SP of the vehicle in which the internal combustion engine 10 is installed. Additionally, the controller 100 refers to a detection signal for calculating the engine rotation speed of the internal combustion engine 10, a detection signal of the amount of intake air, and the like.

Process of Determining Fuel Leakage Anomaly

The controller 100 performs a determination process to determine which of the first and second fuel systems FL1 and FL2 has a fuel leakage anomaly.

The fuel leakage anomaly refers to fuel leakage from the fuel piping 40 or fuel leakage from the first shutoff valve 21 or the second shutoff valve 22. The fuel leakage of the first shutoff valve 21 or the second shutoff valve 22 refers the occurrence of closing anomaly in which the valve bodies of these shutoff valves (21, 22) cannot be closed. In other words, fuel flows from upstream to downstream of a shutoff valve (21, 22) even though a close command to the shutoff valve (21, 22) has been output.

FIG. 2 shows the procedure of the above determination process. The process shown in FIG. 2 is performed by the CPU 110 executing a program stored in the memory 120 of the controller 100. The process shown in FIG. 2 starts in response to a request for starting the internal combustion engine 10 that is in a stopped state, such as when the ignition switch is turned on. That is, before starting this process, the first shutoff valve 21, the second shutoff valve 22, and the fuel injection valves 15 are closed. The pressure reducing valve 30 is open. In the following descriptions, the numbers prefixed with S represent step numbers.

Upon starting the process, the controller 100 outputs an open command to the first shutoff valve 21 to open the first shutoff valve 21 (S100).

The controller 100 then closes the first shutoff valve 21 by outputting a close command to the first shutoff valve 21 at the time when a predetermined time has elapsed after outputting the open command at S100 (S110). The steps of S100 and S110 constitute a first filling process of filling the first fuel system FL1 with gaseous fuel.

The controller 100 then determines whether a first pressure decrease amount P1C is less than or equal to a first threshold value P1Cref (S120).

The first pressure decrease amount P1C is a value obtained by subtracting the first pressure P1 measured at the time when a predetermined time has elapsed after the first shutoff valve 21 is closed at S110 from the first pressure P1 measured at the time when the first shutoff valve 21 is closed at the same step. When the fuel pressure decreases due to a leakage anomaly occurring in the first fuel system FL1, the value of the first pressure decrease amount P1C exceeds the first threshold value P1Cref. The first threshold value P1Cref is obtained by multiplying the first pressure P1 measured when the first shutoff valve 21 is closed at S110 by predetermined coefficient K1. Coefficient K1 is a value within a range of 0<K1<1 and is set in advance.

If it is determined at S120 that the first pressure decrease amount P1C is less than or equal to the first threshold value P1Cref (S120: YES), the controller 100 outputs an open command to the second shutoff valve 22 to open the second shutoff valve 22 (S130).

The controller 100 then closes the second shutoff valve 22 (S140) by outputting a close command to the second shutoff valve 22 at the time when a predetermined time has elapsed after outputting the open command at S130. The steps of S130 and S140 constitute a second filling process of filling the second fuel system FL2 with gaseous fuel.

The controller 100 then determines whether a second pressure decrease amount P2C is less than or equal to a second threshold value P2Cref (S150).

The second pressure decrease amount P2C is a value obtained by subtracting the second pressure P2 measured at the time when a predetermined time has elapsed after the second shutoff valve 22 is closed at S140 from the second pressure P2 measured at the time when the second shutoff valve 22 is closed at the same step. When the fuel pressure decreases due to a leakage anomaly occurring in the second fuel system FL2, the value of the second pressure decrease amount P2C exceeds the second threshold value P2Cref. The second threshold value P2Cref is a value obtained by multiplying the second pressure P2 measured when the second shutoff valve 22 is closed at S140 by predetermined coefficient K2. Coefficient K2 is a value within a range of 0<K2<1 and is set in advance. Coefficient K2 is greater than coefficient K1. Since coefficient K2 is greater than coefficient K1, the pressure range in which it is determined that the second pressure decrease amount P2C does not have an anomaly is larger than the pressure range in which it is determined that the first pressure decrease amount P1C does not have an anomaly. That is, the pressure range in which the pressure decrease relating to the second pressure sensor 82 is determined to be free from anomaly is larger than the pressure range in which the pressure decrease relating to the first pressure sensor 81 is determined to be free from anomaly. The second threshold value P2Cref is set so as to achieve this.

If it is determined at S150 that the second pressure decrease amount P2C is less than or equal to the second threshold value P2Cref (S150: YES), the controller 100 outputs an open command to both the first and second shutoff valves 21 and 22 to open the first and second shutoff valves 21 and 22 (S160). The controller 100 then permits starting the internal combustion engine 10 (S170).

If it is determined at S150 that the second pressure decrease amount P2C exceeds the second threshold value P2Cref (S150: NO), the controller 100 determines that the second fuel system FL2 has a leakage anomaly (S210). Then, the controller 100 prohibits starting the internal combustion engine 10 (S220).

If it is determined at S120 that the first pressure decrease amount P1C exceeds the first threshold value P1Cref (S120: NO), the controller 100 determines whether the second pressure P2 increased when the open command was output to the first shutoff valve 21 at S100 (S180). At S180, if the amount of pressure increase of the second pressure P2 measured in the period from when the open command was output to the first shutoff valve 21 at S100 to when a predetermined time has elapsed since the output is greater than or equal to a predetermined value, the controller 100 determines that the second pressure P2 has increased.

If it is determined that the second pressure P2 has increased (S180: YES), the controller 100 determines that the second shutoff valve 22 has a leakage anomaly (S190). The controller 100 then performs the step of S220.

If it is determined at S180 that the second pressure P2 has not increased (S180: NO), that is, absence of increase in the second pressure P2 is determined, the controller 100 determines that the first fuel system FL1 has a leakage anomaly (S200). The controller 100 then performs the step of S220.

When the step of S170 or the step of S220 is finished, the controller 100 ends this process.

Operation and Advantages

Operation and advantages of the present embodiment are now described.

(1-1) The first fuel system FL1 between the first shutoff valve 21 and the second shutoff valve 22 and the second fuel system FL2 between the second shutoff valve 22 and the fuel injection valves 15 each have a pressure sensor (81, 82). When the first fuel system FL1 has a leakage anomaly or the second fuel system FL2 has a leakage anomaly, the detection value of the pressure sensor (81, 82) indicates this anomaly. As such, the present embodiment performs the determination process shown in FIG. 2. Thus, based on the magnitude relationship between the detection values (P1C, P2C, P2) of these pressure sensors (81, 82) and the predetermined threshold values (P1Cref, P2Cref), it is possible to determine which of the first fuel system FL1 and the second fuel system FL2 has a fuel leakage anomaly.

Specifically, when the second shutoff valve 22 has a closing anomaly in which the second shutoff valve 22 cannot be closed, the second shutoff valve 22 has a leakage anomaly. When the second shutoff valve 22 has a leakage anomaly, the second shutoff valve 22 is not closed, thereby reducing the pressure of the first fuel system FL1 after the first fuel system FL1 is filled with gaseous fuel. Additionally, in filling the first fuel system FL1 with gaseous fuel, the gaseous fuel is also supplied to the second fuel system FL2 through the second shutoff valve 22, which is not fully closed, so that the second pressure P2 detected by the second pressure sensor 82 increases. As such, the present embodiment determines at S190 that the second shutoff valve 22 has a leakage anomaly when the following conditions A and B are both satisfied.

Condition A: A pressure decrease is detected in the first fuel system FL1A based on a negative determination at step S120 (S120: NO) after the filling process (S100, S110) of the first fuel system FL1 is completed.

Condition B: It is detected that the second pressure P2 increased when the open command was output to the first shutoff valve 21 (S100) (S180: YES).

This allows for the detection of a leakage anomaly in the second shutoff valve 22 of the second fuel system FL2 (S190).

(1-2) When the first fuel system FL1, which is upstream of the second shutoff valve 22, has a leakage anomaly, the pressure of the first fuel system FL1 decreases after the first fuel system FL1 is filled with gaseous fuel. When the second shutoff valve 22 is normally closed, the gaseous fuel filling the first fuel system FL1 is not supplied to the second fuel system FL2, so that the second pressure P2 does not increase. As such, the present embodiment determines at S200 that the first fuel system FL1 has a leakage anomaly when the following conditions A and C are both satisfied.

Condition A: A pressure decrease is detected in the first fuel system FL1 based on a negative determination at step S120 (S120: NO) after the filling process (S100, S110) of the first fuel system FL1 is completed.

Condition C: It is detected that the second pressure P2 did not increase when the open command was output to the first shutoff valve 21 (S100) (S180: NO).

This allows for the detection of a leakage anomaly in the first fuel system FL1 upstream of the second shutoff valve 22 (S200).

(1-3) When the second shutoff valve 22 is in a closed state and the second fuel system FL2, which is downstream of the second shutoff valve 22, has a leakage anomaly, the pressure of the first fuel system FL1 does not decrease after the first fuel system FL1 is filled with gaseous fuel. In contrast, the pressure in the second fuel system FL2 decreases after the second fuel system FL2 is filled with gaseous fuel. As such, the present embodiment determines that the second fuel system FL2, which is downstream of the second shutoff valve 22, has a leakage anomaly at S210 when the following conditions D and E are both satisfied.

Condition D: No pressure decrease is detected in the first fuel system FL1 based on an affirmative determination at step S120 (S120: YES) after the filling process (S100, S110) of the first fuel system FL1 is completed.

Condition E: A pressure decrease is detected in the second fuel system FL2 based on a negative determination at step S150 (S150: NO) after the second fuel system FL2 is filled with gaseous fuel (S130, S140).

This allows for the detection of a leakage anomaly in the second fuel system FL2 downstream of the second shutoff valve 22 (S210).

(1-4) As compared to fuel injection valves that inject liquid fuel, the fuel injection valves 15, which inject gaseous fuel, may leak a relatively large amount of fuel from the injection holes while closing. For this reason, when the second fuel system FL2, which includes the fuel injection valves 15 for injecting gaseous fuel, has a leakage anomaly, the degree of pressure decrease in the second fuel system FL2 may be greater than the degree of pressure decrease in the first fuel system FL1 that has a leakage anomaly. In this regard, coefficient K2 is set to a value greater than coefficient K1 in this embodiment. The pressure range in which it is determined that the second pressure decrease amount P2C does not have anomaly is larger than the pressure range in which it is determined that the first pressure decrease amount P1C does not have anomaly. The second threshold value P2Cref is set so as to achieve this. This reduces the likelihood that the leakage occurring while the fuel injection valves 15 are normally closed is incorrectly determined to be leakage from the second fuel system FL2, thereby increasing the accuracy of determining a leakage anomaly.

Figure 3:
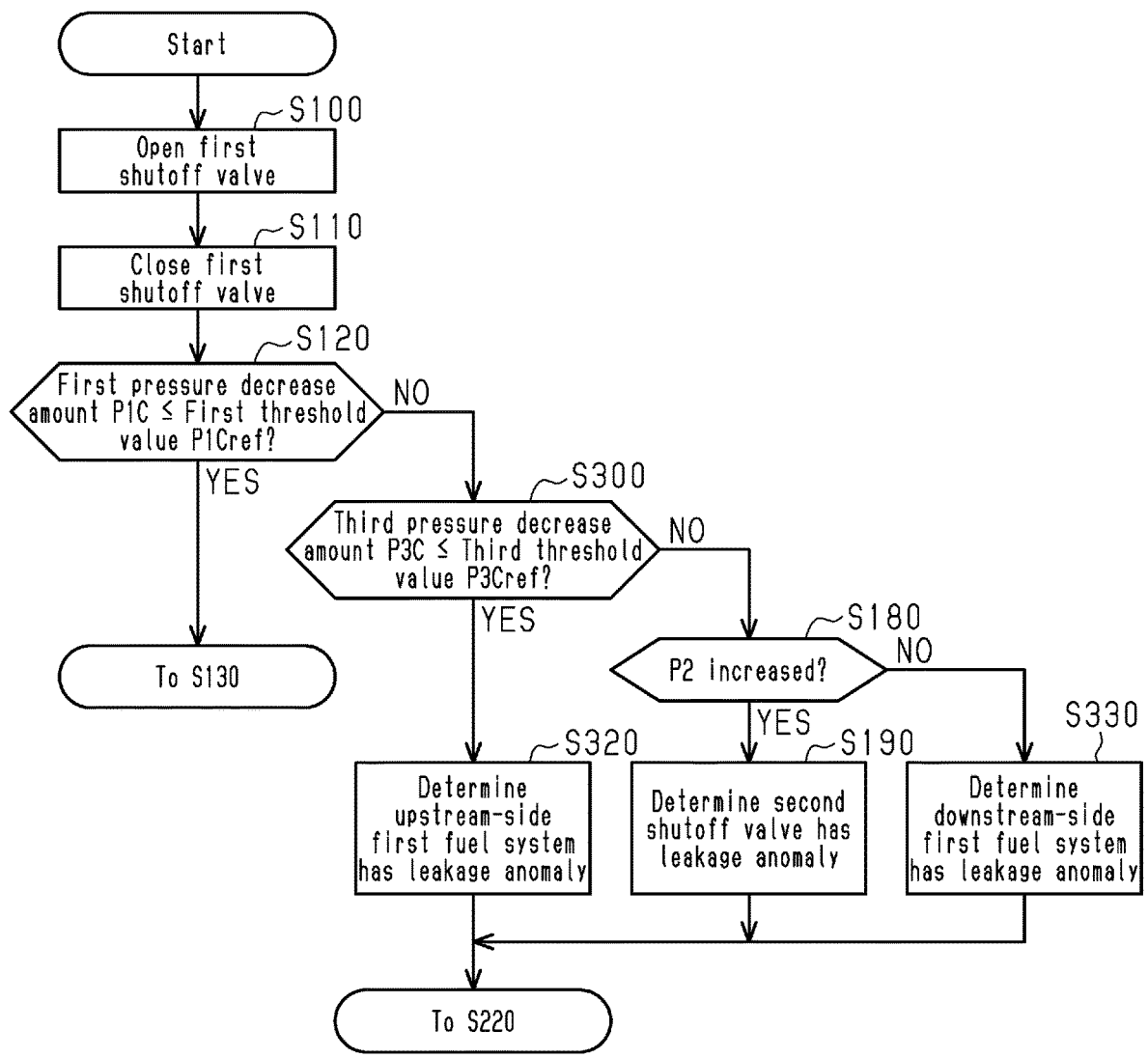
FIG. 3 is a flowchart partially relating to FIG. 2, showing a procedure of a determination process performed by a controller according to a second embodiment.

Referring to FIG. 3, an anomaly detection device, an anomaly detection method, and an anomaly detection process for an internal combustion engine according to a second embodiment are now described.

Fuel Leakage Anomaly Determination Process of Present Embodiment

As shown in FIG. 3, the determination process of this embodiment is partially modified from the determination process described in the first embodiment. The determination process of this embodiment is described below, focusing on the differences. In FIG. 3, the same step numbers are given to the same steps as those shown above in FIG. 2.

As shown in FIG. 3, when a negative determination is made at the step of S120 described above, the controller 100 performs the step of S300.

At S300, the controller 100 determines whether a third pressure decrease amount P3C is less than or equal to a third threshold value P3Cref.

The third pressure decrease amount P3C is a value obtained by subtracting the third pressure P3 measured at the time when a predetermined time has elapsed after the first shutoff valve 21 is closed at S110 from the third pressure P3 measured at the time when the first shutoff valve 21 is closed at the same step. When the value of the third pressure decrease amount P3C exceeds the third threshold value P3Cref (S300: NO), a decrease of the third pressure P3 is detected (S300). The third threshold value P3Cref is obtained by multiplying the third pressure P3 measured when the first shutoff valve 21 is closed at S110 by predetermined coefficient K3. Coefficient K3 is a value within a range of 0<K3<1 and is set in advance.

If it is determined at S300 that the third pressure decrease amount P3C is less than or equal to the third threshold value P3Cref (S300: YES), the controller 100 determines that the upstream first fuel system FL1H, which is the section of the first fuel system FL1 upstream of the pressure reducing valve 30, has a leakage anomaly (S320). The controller 100 then performs the step of S220 above. In the drawings, "upstream first fuel system FL1H" may be referred to as "upstream-side first fuel system FL1H," and "downstream first fuel system FL1L" may be referred to as "downstream-side first fuel system FL1L" as appropriate.

If it is determined that the third pressure decrease amount P3C exceeds the third threshold value P3Cref (S300: NO), the controller 100 performs the step of S180. That is, the controller 100 determines whether the second pressure P2 increased when the open command was output to the first shutoff valve 21 at S100 (S180).

If it is determined that the second pressure P2 has increased (S180: YES), the controller 100 determines that the second shutoff valve 22 has a leakage anomaly (S190). The controller 100 then performs the step of S220.

If it is determined at S180 that the second pressure reducing valve P2 has not increased (S180: NO), the controller 100 determines that the downstream first fuel system FL1L, which is the section of the first fuel system FL1 downstream of the pressure reducing valve 30, has a leakage anomaly (S330). The controller 100 then performs the step of S220 above.

Operation and Advantages

The present embodiment has the following operation and advantages, as well as the same operation and advantages as the first embodiment.

(2-1) When the upstream first fuel system FL1H, which is the section of the first fuel system FL1 upstream of the pressure reducing valve 30, has a leakage anomaly, the pressure decreases between the first shutoff valve 21 and the pressure reducing valve 30 after the first fuel system FL1 is filled with gaseous fuel, whereas the pressure does not decrease between the pressure reducing valve 30 and the second shutoff valve 22. As such, the present embodiment determines at S320 that the upstream first fuel system FL1H has a leakage anomaly when the following conditions F and G are both satisfied.

Condition F: A pressure decrease is detected in the upstream first fuel system FL1H, which is the section of the first fuel system FL1 between the first shutoff valve 21 and the pressure reducing valve 30 based on a negative determination at S120 (S120: NO) after the filling process (S100, S110) of the first fuel system FL1 is completed.

Condition G: No pressure decrease is detected in the downstream first fuel system FL1L, which is the section of the first fuel system FL1 between the pressure reducing valve 30 and the second shutoff valve 22, based on an affirmative determination at the step of S300 (S300: YES).

This allows for the detection of a leakage anomaly in the upstream first fuel system FL1H, which is the section of the first fuel system FL1 upstream of the pressure reducing valve 30 (S320).

(2-2) When the downstream first fuel system FL1L, which is the section of the first fuel system FL1 downstream of the pressure reducing valve 30, has a leakage anomaly, after the first fuel system FL1 is filled with gaseous fuel, the pressure decreases between the first shutoff valve 21 and the pressure reducing valve 30, and the pressure also decreases between the pressure reducing valve 30 and the second shutoff valve 22. A pressure decrease between the pressure reducing valve 30 and the second shutoff valve 22 also occurs when the second shutoff valve 22 is not closed normally. As such, when the pressure decreases between the pressure reducing valve 30 and the second shutoff valve 22 despite that the second shutoff valve 22 is normally closed, the downstream first fuel system FL1L, which is the section of the first fuel system FL1 downstream of the pressure reducing valve 30, is determined to have a leakage anomaly. As such, the present embodiment determines at S320 that the upstream first fuel system FL1H has a leakage anomaly when the following conditions F, H, and C are all satisfied.

Condition F: A pressure decrease is detected in the upstream first fuel system FL1H, which is the section of the first fuel system FL1 between the first shutoff valve 21 and the pressure reducing valve 30, based on a negative determination at S120 (S120: NO) after the filling process (S100, S110) of the first fuel system FL1 is completed.

Condition H: A pressure decrease is detected in the downstream first fuel system FL1L, which is the section of the first fuel system FL1 between the pressure reducing valve 30 and the second shutoff valve 22, based on a negative determination at S300 (S300: NO).

Condition C: It is detected that the second pressure P2 did not increase when the open command was output to the first shutoff valve 21 (S100) (S180: NO). That is, the second shutoff valve 22 is closed normally.

This allows for the detection of a leakage anomaly in the downstream first fuel system FL1L, which is the section of the first fuel system FL1 downstream of the pressure reducing valve 30 (S320).

Figure 4:
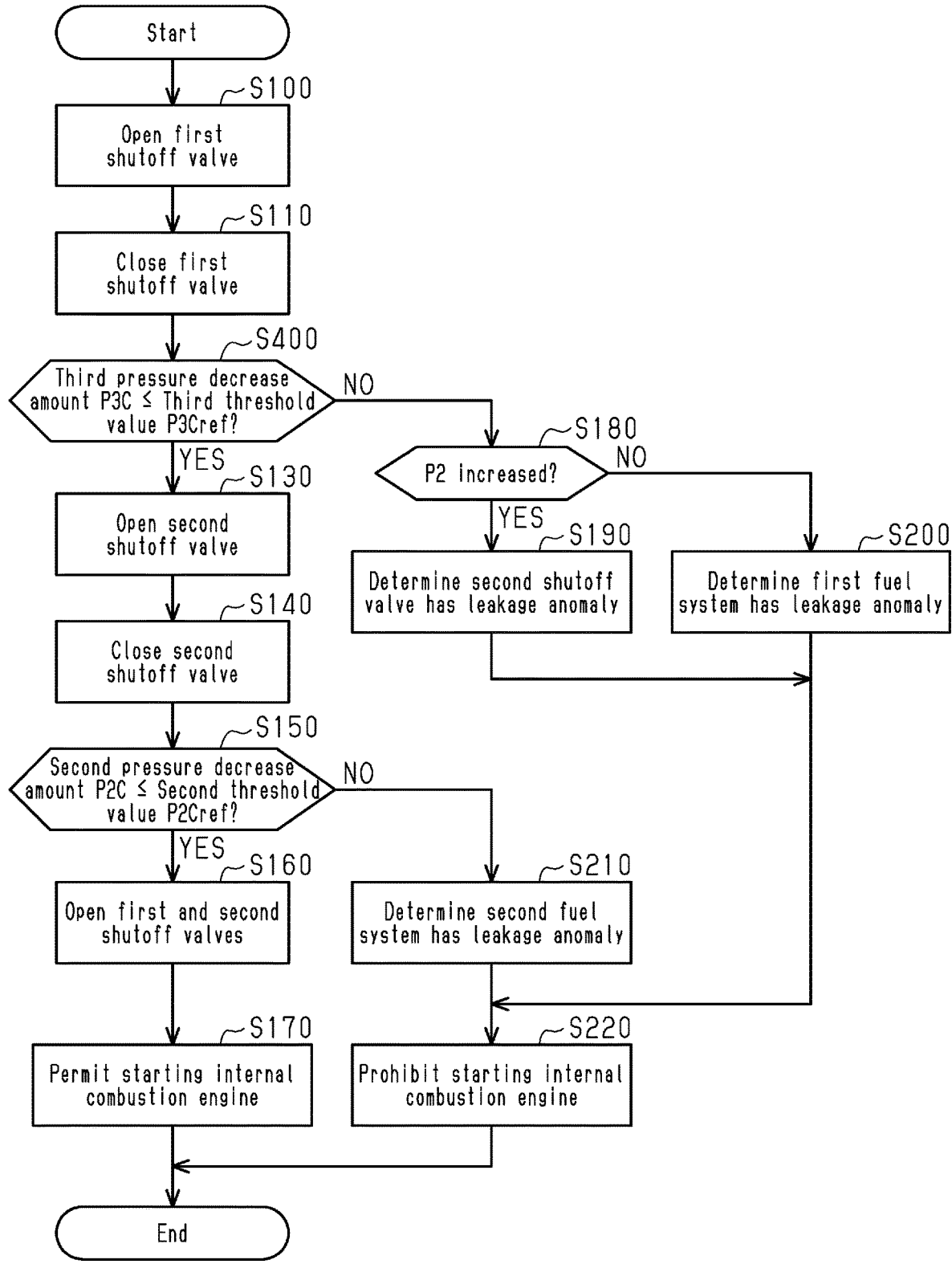
FIG. 4 is a flowchart partially relating to FIG. 2, showing a procedure of a determination process performed by a controller according to a third embodiment.

Referring to FIG. 4, an anomaly detection device, an anomaly detection method, and an anomaly detection process for an internal combustion engine according to a third embodiment are now described.

Fuel Leakage Anomaly Determination Process of Present Embodiment

As shown in FIG. 4, the determination process of this embodiment is partially modified from the determination process described in the first embodiment. The determination process of this embodiment is described below, focusing on the differences. In FIG. 4, the same step numbers are given to the same steps as those shown in FIG. 2 above.

As shown in FIG. 4, the controller 100 performs the step of S400 instead of the step of S120 described above in FIG. 2. At S400, the controller 100 determines whether the third pressure decrease amount P3C is less than or equal to the third threshold value P3Cref.

The third pressure decrease amount P3C and the third threshold value P3Cref are the same as the values described in the second embodiment of FIG. 3. However, the third threshold value P3Cref may be a value different from the value described in the second embodiment.

If an affirmative determination is made at S400, the controller 100 performs the steps from S130. If a negative determination is made at S400, the controller 100 performs the steps from S180.

Operation and Advantages

Operation and advantages of the present embodiment are now described.

(3-1) The pressure reducing valve 30 provides communication between the upstream first fuel system FL1H including the first pressure sensor 81 and the downstream first fuel system FL1L including the third pressure sensor 83. As such, the first pressure P1 and the third pressure P3 are different in magnitude but have the same tendency of change. This allows the determination of whether the pressure decreases in the first fuel system FL1 to be made based on one of the first and third pressures P1 and P3. The present embodiment thus uses the third pressure P3 to determine whether the pressure has decreased in the first fuel system FL1 after the filling process (S100, S110) of the first fuel system FL1 is completed (S400). Accordingly, the present embodiment has the same operation and advantages as the first embodiment.

Figure 5:
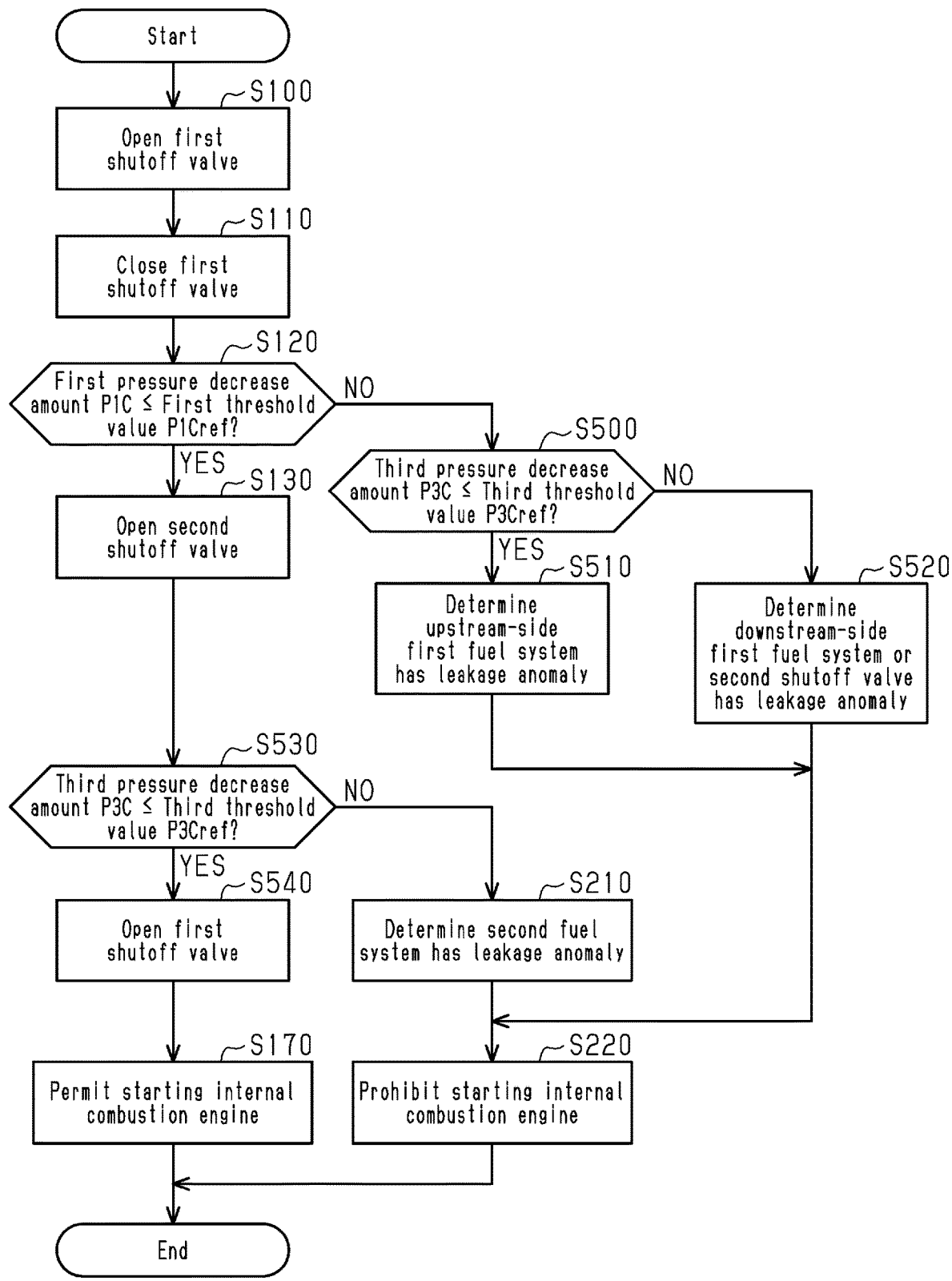
FIG. 5 is a flowchart relating to FIG. 3, showing a procedure of a determination process performed by a controller according to a fourth embodiment.

Referring to FIG. 5, an anomaly detection device, an anomaly detection method, and an anomaly detection process for an internal combustion engine according to a fourth embodiment are now described.

Fuel Leakage Anomaly Determination Process of Present Embodiment

As shown in FIG. 5, the determination process of this embodiment is partially modified from the determination process described in the first embodiment. Specifically, the present embodiment uses the third pressure P3 instead of the second pressure P2 to perform the determination process. The determination process of this embodiment is described below, focusing on the differences. In FIG. 5, the same step numbers are given to the same steps as those shown in FIG. 2 above.

As shown in FIG. 5, when an affirmative determination is made at step S120 described above (S120: YES), the controller 100 performs the step of S130 to open the second shutoff valve 22. The controller 100 then determines whether the third pressure decrease amount P3C is less than or equal to the third threshold value P3Cref (S530).

The third pressure decrease amount P3C at S530 is a value obtained by subtracting the third pressure P3 measured at the time when a predetermined time has elapsed after the second shutoff valve 22 is opened at S130 from the third pressure P3 measured at the time when the second shutoff valve 22 is opened at the same step. When the value of the third pressure decrease amount P3C exceeds the third threshold value P3Cref, a decrease of the third pressure P3 is detected. The third threshold value P3Cref is obtained by multiplying the third pressure P3 measured when the first shutoff valve 21 is opened at S130 by predetermined coefficient K6. Coefficient K6 is a value within a range of 0<K6<1 and is set in advance.

If it is determined at S530 that the third pressure decrease amount P3C is less than or equal to the third threshold value P3Cref (S530: YES), an open command is output to the first shutoff valve 21 to open the first shutoff valve 21 (S540). Then, the step of S170 above is performed.

If it is determined at S530 that the third pressure decrease amount P3C exceeds the third threshold value P3Cref (S530: NO), the controller 100 determines that the second fuel system FL2, which is downstream of the second shutoff valve 22, has a leakage anomaly (S210). The controller 100 then performs the step of S220.

If a negative determination is made at S120 described above (S120: NO), the controller 100 determines whether the third pressure decrease amount P3C is less than or equal to the third threshold value P3Cref (S500). The third pressure decrease amount P3C and the third threshold value P3Cref at S500 are the same as the values at the step of S300 described above with reference to FIG. 3.

If it is determined at S500 that the third pressure decrease amount P3C is less than or equal to the third threshold value P3Cref (S500: YES), the controller 100 determines that the upstream first fuel system FL1H has a leakage anomaly (S510). The controller 100 then performs the step of S220.

If it is determined at S500 that the third pressure decrease amount P3C exceeds the third threshold value P3Cref (S500: NO), the controller 100 determines that the downstream first fuel system FL1L or the second shutoff valve 22 has a leakage anomaly (S520). The controller 100 then performs the step of S220.

Operation and Advantages

Operation and advantages of the present embodiment are now described.

(4-1) When the second shutoff valve 22 is in the closed state and the second fuel system FL2, which is downstream of the second shutoff valve 22, has a leakage anomaly, the pressure of the upstream first fuel system FL1H does not decrease after the first fuel system FL1 is filled with gaseous fuel. In contrast, when the second shutoff valve 22 is opened while the second fuel system FL2, which is downstream of the second shutoff valve 22, has a leakage anomaly, the pressure in the second fuel system FL2 decreases. When the second shutoff valve 22 is open, the pressure in the downstream first fuel system FL1L therefore decreases as the pressure in the second fuel system FL2 decreases. As such, the present embodiment determines at S210 that the second fuel system FL2, which is downstream of the second shutoff valve 22, has a leakage anomaly when the following conditions I and J are both satisfied.

Condition I: No pressure decrease is detected in the upstream first fuel system FL1H based on an affirmative determination at S120 (S120: YES) after the filling process (S100, S110) of the first fuel system FL1 is completed.

Condition J: A pressure decrease is detected in the downstream first fuel system FL1L based on a negative determination at step S530 (S530: NO) after opening the second shutoff valve 22 (S130).

This allows for the detection of a leakage anomaly in the second fuel system FL2 downstream of the second shutoff valve 22 (S210).

(4-2) When the upstream first fuel system FL1H, which is the section of the first fuel system FL1 upstream of the pressure reducing valve 30, has a leakage anomaly, the pressure decreases between the first shutoff valve 21 and the pressure reducing valve 30 (FL1H) after the first fuel system FL1 is filled with gaseous fuel. In contrast, the pressure in unlikely to decrease between the pressure reducing valve 30 and the second shutoff valve 22 (FL1L). As such, the present embodiment determines at S510 that the upstream first fuel system FL1H has a leakage anomaly when the following conditions K and L are both satisfied.

Condition K: A pressure decrease is detected in the upstream first fuel system FL1H between the first shutoff valve 21 and the pressure reducing valve 30 based on a negative determination at S120 (S120: NO) after the filling process (S100, S110) of the first fuel system FL1 is completed.

Condition L: No pressure decrease is detected in the downstream first fuel system FL1L between the pressure reducing valve 30 and the second shutoff valve 22 based on an affirmative determination at S500 (S500: YES).

This allows for the detection of a leakage anomaly in the upstream first fuel system FL1H, which is the section of the first fuel system FL1 upstream of the pressure reducing valve 30 (S510).

(4-3) When the downstream first fuel system FL1L, which is the section of the first fuel system FL1 downstream of the pressure reducing valve 30, or the second shutoff valve 22 has a leakage anomaly, the pressure decreases in the upstream first fuel system FL1H between the first shutoff valve 21 and the pressure reducing valve 30 after the first fuel system FL1 is filled with gaseous fuel. The pressure also decreases in the downstream first fuel system FL1L between the pressure reducing valve 30 and the second shutoff valve 22. As such, the present embodiment determines at S520 that the downstream first fuel system FL1L or the second shutoff valve 22 has a leakage anomaly when the following conditions K and M are both satisfied.

Condition K: A pressure decrease is detected in the upstream first fuel system FL1H, which is the section of the first fuel system FL1 between the first shutoff valve 21 and the pressure reducing valve 30, based on a negative determination at S120 (S120: NO) after the filling process (S100, S110) of the first fuel system FL1 is completed.

Condition M: A pressure decrease is detected in the downstream first fuel system FL1L between the pressure reducing valve 30 and the second shutoff valve 22 based on a negative determination at S500 (S500: NO).

This allows for the detection of a leakage anomaly in the downstream first fuel system FL1L, which is the section of the first fuel system FL1 downstream of the pressure reducing valve 30, or the second shutoff valve 22 (S520).

Figure 6:
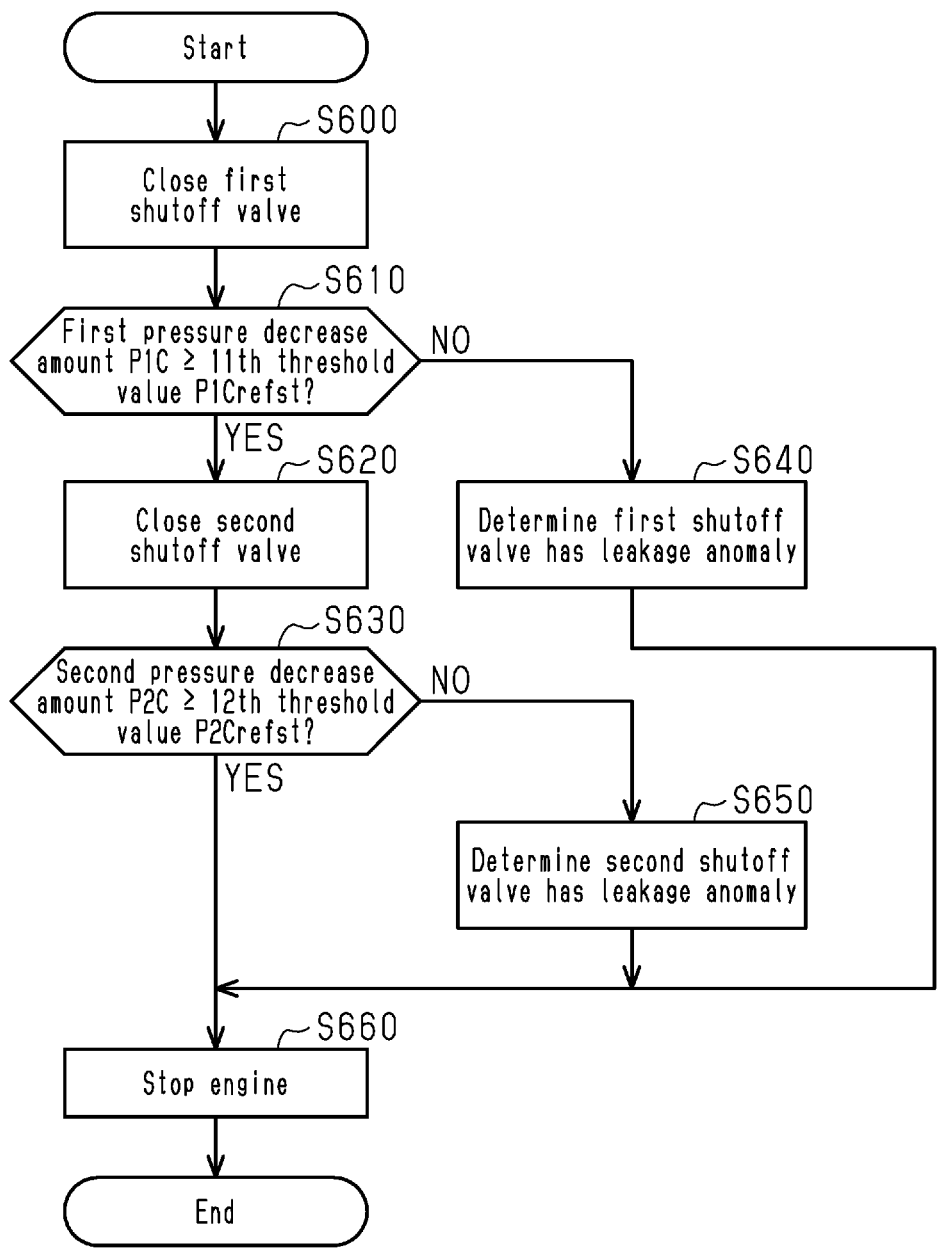
FIG. 6 is a flowchart relating to FIG. 2, showing a procedure of a determination process performed by a controller according to a fifth embodiment.

Referring to FIG. 6, an anomaly detection device, an anomaly detection method, and an anomaly detection process for an internal combustion engine according to a fifth embodiment are now described.

Fuel Leakage Anomaly Determination Process of Present Embodiment

FIG. 6 shows the determination process according to the present embodiment. The process shown in FIG. 6 is performed by the CPU 110 executing a program stored in the memory 120 of the controller 100. The process shown in FIG. 6 starts in response to a request for stopping the internal combustion engine 10 that is in operation, such as when the ignition switch is turned off.

Upon starting the process, the controller 100 performs a first closing process to close the first shutoff valve 21, which is open, by outputting a close command to the first shutoff valve 21 (S600).

The controller 100 then determines whether the first pressure decrease amount P1C is greater than or equal to an 11th threshold value P1Crefst (S610).

The first pressure decrease amount P1C is a value obtained by subtracting the first pressure P1 measured at the time when a predetermined time has elapsed after the first shutoff valve 21 is closed at S600 from the first pressure P1 measured at the time when the first shutoff valve 21 is closed at the same step. When the first shutoff valve 21 does not have a leakage anomaly, the value of the first pressure decrease amount P1C is greater than or equal to the 11th threshold value P1Crefst (S610: YES). The 11th threshold value P1Crefst is a value obtained by multiplying the first pressure P1 measured when the first shutoff valve 21 is closed at S600 by predetermined coefficient K3. Coefficient K3 is a value within a range of 0<K3<1 and is set in advance. Also, this coefficient K3 is set to a value greater than the above-mentioned coefficient K1, so that the 11th threshold value P1Crefst of this embodiment is greater than the first threshold value P1Cref. This is because the pressure decrease in the fuel system that occurs after the first shutoff valve 21 is closed is greater when the internal combustion engine 10 is operating than when the internal combustion engine 10 is stopped, due to the fuel injection from the fuel injection valves 15 during operation.

If it is determined at S610 that the first pressure decrease amount P1C is greater than or equal to the 11th threshold value P1Crefst, the controller 100 outputs a close command to the second shutoff valve 22, which is open, to perform a second closing process that closes the second shutoff valve 22 (S620).

The controller 100 then determines whether the second pressure decrease amount P2C is greater than or equal to a 12th threshold value P2Crefst (S630).

The second pressure decrease amount P2C is a value obtained by subtracting the second pressure P2 measured at the time when a predetermined time has elapsed after the second shutoff valve 22 is closed at S620 from the second pressure P2 measured at the time when the second shutoff valve 22 is closed at the same step. When the second shutoff valve 22 does not have a leakage anomaly, the value of the second pressure decrease amount P2C is greater than or equal to a 12th threshold value P2Crefst. The 12th threshold value P2Crefst is a value obtained by multiplying the second pressure P2 measured when the second shutoff valve 22 is closed at S620 by predetermined coefficient K4. Coefficient K4 is a value within a range of 0<K4<1 and is set in advance. Also, coefficient K4 is greater than coefficient K2. Since coefficient K4 is set to a value greater than the above-mentioned coefficient K2, the 12th threshold value P2Crefst of this embodiment is greater than the second threshold value P2Cref. As described above, this is because the pressure decrease in the fuel system that occurs after the second shutoff valve 22 is closed is greater when the internal combustion engine 10 is operating than when the internal combustion engine 10 is stopped, due to the fuel injection from the fuel injection valves 15 during operation.

If it is determined at S630 that the second pressure decrease amount P2C is greater than or equal to the second threshold value P2Cref, the controller 100 ends this process while stopping the engine (S600).

If it is determined at S610 that the first pressure decrease amount P1C is less than the 11th threshold value P1Crefst (S610: NO), the controller 100 determines that the first shutoff valve 21 has a leakage anomaly (S640). Then, the step of S660 is performed.

If it is determined at S630 that the second pressure decrease amount P2C is less than the 12th threshold value P2Crefst (S630: NO), the controller 100 determines that the second shutoff valve 22 has a leakage anomaly (S650). Then, the step of S660 is performed.

Operation and Advantages

Operation and advantages of the present embodiment are now described.

(5-1) When a closing anomaly occurs in which the first shutoff valve 21 cannot be closed, the first shutoff valve 21 has a leakage anomaly. When a close command is output to the first shutoff valve 21 while the internal combustion engine 10 is in operation and the first shutoff valve 21 does not have a leakage anomaly, the fuel injection valves 15 inject fuel in a state in which the fuel supply to the first fuel system FL1 is stopped, causing the pressure in the first fuel system FL1 to decrease. In contrast, when the first shutoff valve 21 has a leakage anomaly, outputting a close command to the first shutoff valve 21 while the internal combustion engine 10 is in operation does not close the first shutoff valve 21. The fuel is thus continued to be supplied to the first fuel system FL1, so that the pressure in the first fuel system FL1 does not decrease. As such, the present embodiment determines at S640 that the first shutoff valve 21 has a leakage anomaly when the following condition N is satisfied.

Condition N: No pressure decrease is detected in the first fuel system FL1 based on a negative determination at S610 after a close command is output to the first shutoff valve 21 (S600).

This allows for the detection of a leakage anomaly in the first shutoff valve 21.

(5-2) When a closing anomaly occurs in which the second shutoff valve 22 cannot be closed, the second shutoff valve 22 has a leakage anomaly. When a close command is output to the second shutoff valve 22 while the internal combustion engine 10 is in operation and the second shutoff valve 22 does not have a leakage anomaly, the fuel injection valves 15 inject fuel in a state in which the fuel supply to the second fuel system FL2 is stopped, causing the pressure in the second fuel system FL2 to decrease. In contrast, when the second shutoff valve 22 has a leakage anomaly, outputting a close command to the second shutoff valve 22 while the internal combustion engine 10 is in operation does not close the second shutoff valve 22. The fuel is thus continued to be supplied to the second fuel system FL2, so that the pressure in the second fuel system FL2 does not decrease. As such, the present embodiment determines at S650 that the second shutoff valve 22 has a leakage anomaly when the following condition O is satisfied.

Condition O: No pressure decrease is detected in the second fuel system FL2 based on a negative determination at S630 after a close command is output to the second shutoff valve 22 (S620).

This allows for the detection of a leakage anomaly in the second shutoff valve 22.

(5-3) The present embodiment outputs a close command to the first shutoff valve 21 or the second shutoff valve 22 (S600, S620) in response to a request for stopping the internal combustion engine 10. This limits the influence on the operation of the internal combustion engine 10 caused by closing the first shutoff valve 21 or the second shutoff valve 22, as compared to a configuration that outputs a close command when there is no request for stopping, for example.

Figure 7:
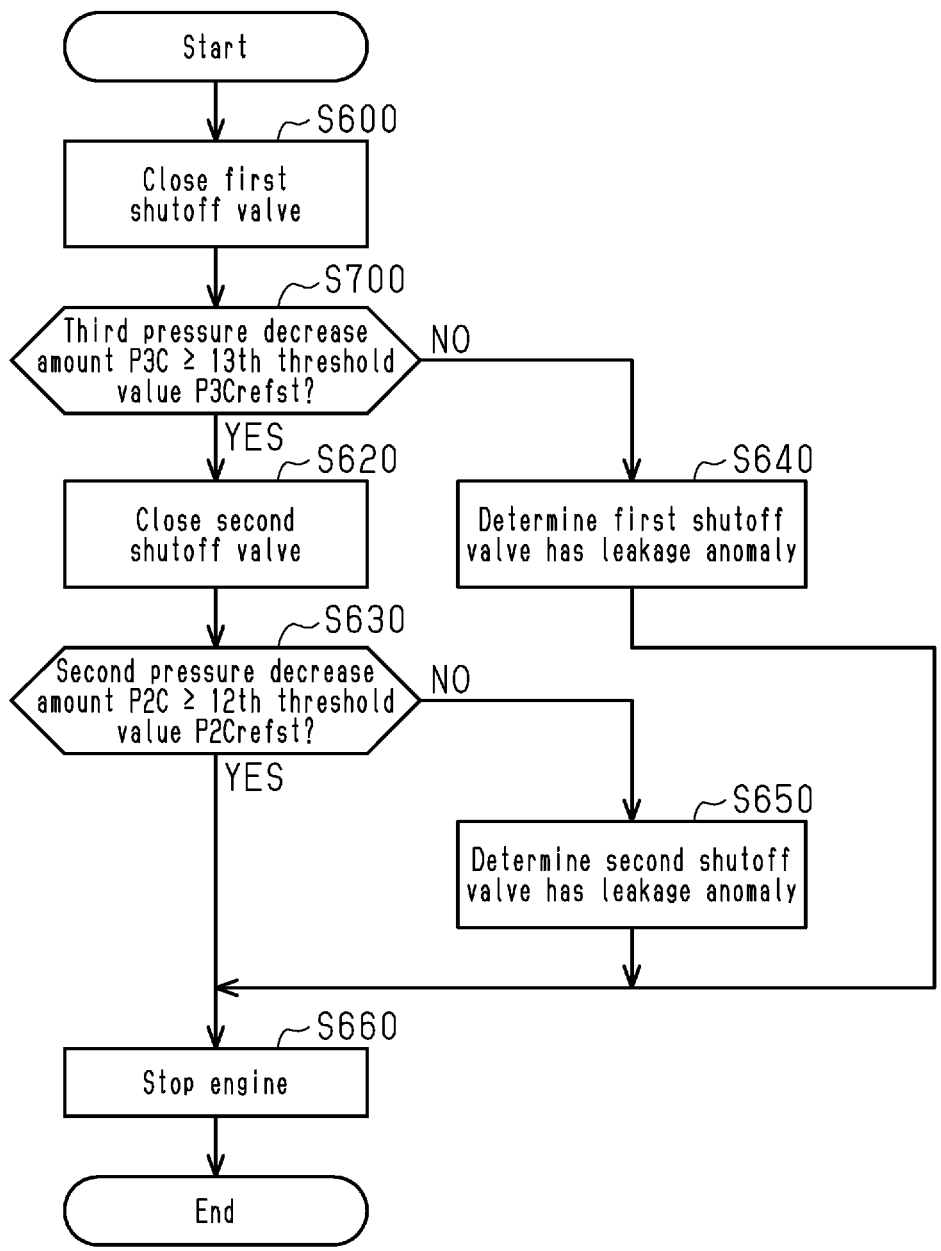
FIG. 7 is a flowchart partially relating to FIG. 6, showing a procedure of a determination process performed by a controller according to a sixth embodiment.

Referring to FIG. 7, an anomaly detection device, an anomaly detection method, and an anomaly detection process for an internal combustion engine according to a sixth embodiment are now described.

Fuel Leakage Anomaly Determination Process of Present Embodiment

As shown in FIG. 7, the determination process of this embodiment is partially modified from the determination process described in the fifth embodiment. The determination process of this embodiment is described below, focusing on the differences. In FIG. 7, the same step numbers are given to the same steps as those shown in FIG. 6 above.

As shown in FIG. 7, the controller 100 performs the step of S700 instead of the step of S610 described above. At S700, the controller 100 determines whether the third pressure decrease amount P3C is greater than or equal to a 13th threshold value P3Crefst.

The third pressure decrease amount P3C is a value obtained by subtracting a third pressure P3 measured at the time when a predetermined time has elapsed after the first shutoff valve 21 is closed at S600 from the third pressure P3 measured at the time when the first shutoff valve 21 is closed at the same step. When the first shutoff valve 21 does not have a leakage anomaly, the value of the third pressure decrease amount P3C is greater than or equal to the 13th threshold value P3Crefst.

The 13th threshold value P3Crefst is a value obtained by multiplying the third pressure P3 measured when the first shutoff valve 21 is closed at S600 by predetermined coefficient K5. Coefficient K5 is a value within a range of 0<K5<1 and is set in advance. Coefficient K5 is set to a value greater than the above-mentioned coefficient K3. The 13th threshold value P3Crefst of this embodiment is therefore greater than the third threshold value P3Cref described above. As described above, this is because the pressure decrease in the fuel system that occurs after the first shutoff valve 21 is closed is greater when the internal combustion engine 10 is in operation than when the internal combustion engine 10 is stopped, due to the fuel injection from the fuel injection valves 15 during operation.

If an affirmative determination is made at S700, the controller 100 performs the steps from S620. If a negative determination is made at S700, the controller 100 performs the steps from S640.

Operation and Advantages

Operation and advantages of the present embodiment are now described.

(6-1) The pressure reducing valve 30 provides communication between the upstream first fuel system FL1H including the first pressure sensor 81 and the downstream first fuel system FL1L including the third pressure sensor 83. As such, the first pressure P1 and the third pressure P3 are different in magnitude but have the same tendency of change. This allows the determination of whether the pressure decreases in the first fuel system FL1 to be made based on one of the first and third pressures P1 and P3. The present embodiment thus uses the third pressure P3 to determine whether the pressure has decreased in the first fuel system FL1. Accordingly, the present embodiment has the same operation and advantages as the fifth embodiment.

Modifications

The embodiment described above may be modified as follows. The embodiments and the following modifications may be combined to an extent that does not cause technical contradiction.

In each embodiment, the first magnitude relationship, which is the magnitude relationship between the detection value of the first pressure sensor 81 and the first threshold value, is the magnitude relationship between the first pressure decrease amount P1C, which is the amount of change in the detection value of the first pressure sensor 81, and the first threshold value. The second magnitude relationship, which is the magnitude relationship between the detection value of the second pressure sensor 82 and the second threshold value, is the magnitude relationship between the second pressure decrease amount P2C, which is the amount of change in the detection value of the second pressure sensor 82, and the second threshold value.

Figure 8:
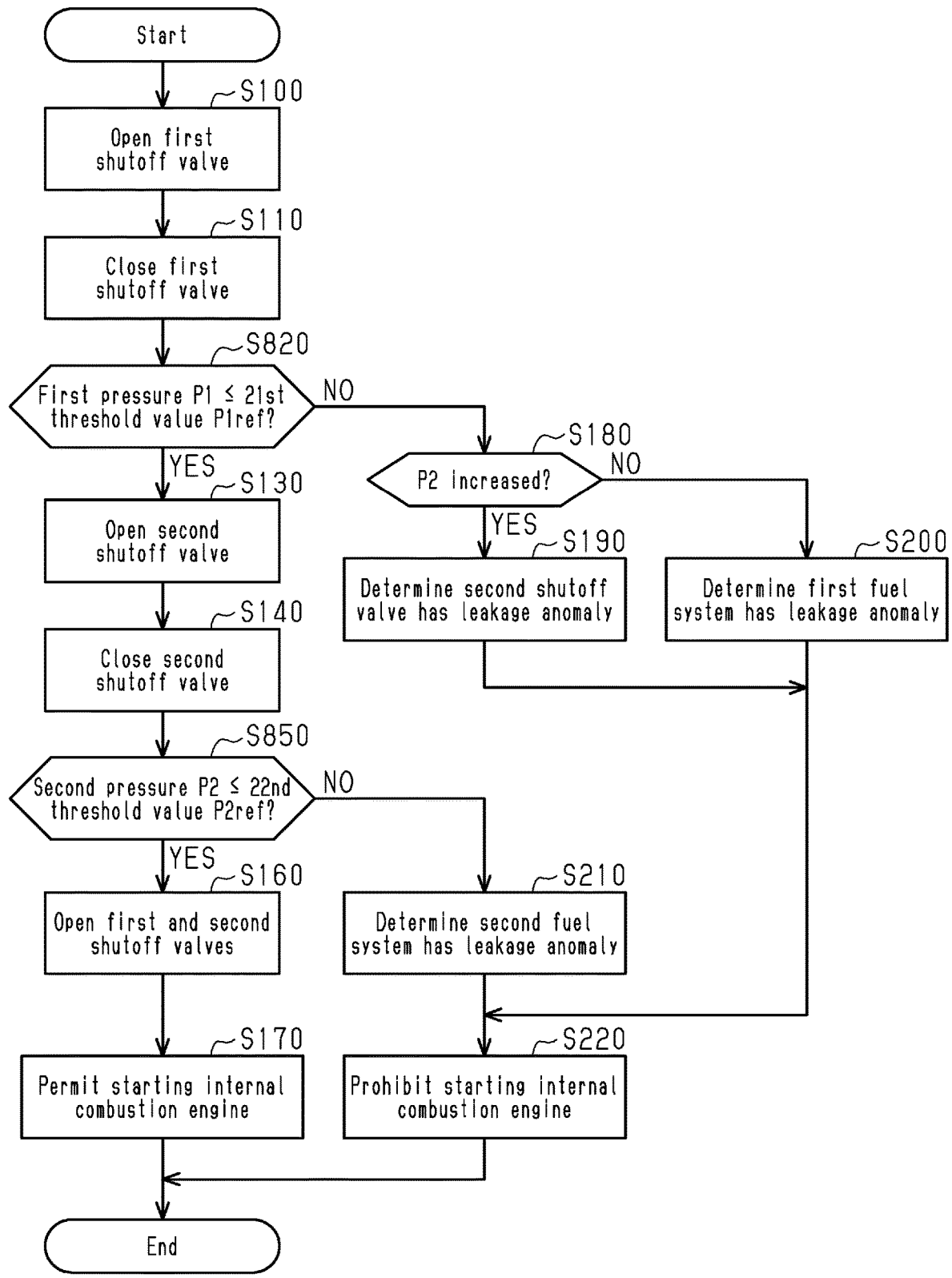
FIG. 8 is a flowchart partially relating to FIG. 2, showing a procedure of a determination process performed by a controller in a modification of the first embodiment.

Alternatively, the first magnitude relationship, which is the magnitude relationship between the detection value of the first pressure sensor 81 and the first threshold value, may be the magnitude relationship between the pressure value detected by the first pressure sensor 81 after the first fuel system FL1 is filled with gaseous fuel system and the first threshold value. Likewise, the second magnitude relationship, which is the magnitude relationship between the detection value of the second pressure sensor 82 and the second threshold value, may be the magnitude relationship between the pressure value detected by the second pressure sensor 82 after the second fuel system FL2 is filled with gaseous fuel system and the second threshold value. FIG. 8 shows a determination process in which the above modifications are applied to the first embodiment.

As shown in FIG. 8, this modification determines whether the first pressure P1 is less than or equal to a 21st threshold value P1ref at S820 in place of S120 of FIG. 2 above. This first pressure P1 is the first pressure P1 measured when the first shutoff valve 21 is closed at S110 described above. The 21st threshold value P1ref is a value obtained by multiplying the first pressure P1 measured when the first shutoff valve 21 is closed at S110 described above by a value of (1−coefficient K1). Coefficient K1 is the same as coefficient K1 described above.

This modification also determines whether the second pressure P2 is less than or equal to a 22nd threshold value P2ref at S850 in place of S150 of FIG. 2 above. This second pressure P2 is the second pressure P2 measured when the second shutoff valve 22 is closed at S140. The 22nd threshold value P2ref is a value obtained by multiplying the second pressure P2 measured when the second shutoff valve 22 is at S140 described above by a value of (1−coefficient K2), for example. Coefficient K2 is the same as coefficient K2 described above. The first pressure P1 and the second pressure P2 in this modification are absolute pressures or gauge pressures.

Coefficient K2 is greater than coefficient K1. As such, the value of (1−coefficient K2) is less than the value of (1−coefficient K1). The ratio of the 22nd threshold value P2ref to the second pressure P2 is less than the ratio of the 21st threshold value P1ref to the first pressure P1. As such, the pressure range in which it is determined that the second pressure P2 does not have anomaly is larger than the pressure range in which it is determined that the first pressure P1 does not have anomaly. The 22nd threshold value P2ref is set so as to achieve this. Thus, the same operation and advantage as (1-4) above can be obtained.

The first magnitude relationship between the detection value of the first pressure sensor 81 and the first threshold value may be the magnitude relationship between the rate of change of the detection value of the first pressure sensor 81 and the first threshold value. Likewise, the second magnitude relationship between the detection value of the second pressure sensor 82 and the second threshold value may be the magnitude relationship between the rate of change of the detection value of the second pressure sensor 82 and the second threshold value.

Each threshold value described above (e.g., P1Cref, P2Cref, . . . ) is a value obtained by multiplying a pressure value (e.g., P1, P2, . . . ) by coefficient K (e.g. K1, K2, . . . ), but may be a predetermined fixed value.

In the fifth and sixth embodiments, only a leakage anomaly of the first shutoff valve 21 may be determined, or only a leakage anomaly of the second shutoff valve 22 may be determined.

In the first and fifth embodiments, the third pressure sensor 83 may be omitted.

The gaseous fuel is hydrogen gas, but other gaseous fuel such as compressed natural gas may also be used.

The controller 100 includes the CPU 110 and the memory 120 and executes software processing. However, this is merely an example. For example, the controller 100 may include a dedicated hardware circuit (such as an ASIC) that executes at least part of the software processing executed in the above-described embodiments. That is, the controller 100 may be modified as long as it has any one of the following configurations (a) to (c). (a) A configuration including a processor that executes all of the above-described processes according to programs and a program storage device such as a memory that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. Multiple software circuits each including a processor and a program storage device and multiple dedicated hardware circuits may be provided. That is, the above processes may be executed in any manner as long as the processes are executed by processing circuitry that includes at least one of a set of one or more software circuits and a set of one or more dedicated hardware circuits. The program storage device, which is a computer-readable medium, includes any type of media that are accessible by general-purpose computers and dedicated computers (including a non-transitory computer-readable storage medium).

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. An anomaly detection device for an internal combustion engine, the anomaly detection device comprising a control circuit, wherein
the control circuit is configured to perform a determination process for determining a leakage anomaly in a first fuel system or a second fuel system of a fuel supply device of the internal combustion engine, the fuel supply device includes a tank that stores gaseous fuel, a fuel injection valve that supplies fuel to a cylinder, a fuel passage that supplies the gaseous fuel in the tank to the fuel injection valve, a first shutoff valve disposed downstream of the tank in the fuel passage, a pressure reducing valve disposed downstream of the first shutoff valve in the fuel passage, a second shutoff valve disposed downstream of the pressure reducing valve in the fuel passage, a first pressure sensor disposed in the first fuel system, and a second pressure sensor disposed in the second fuel system, the first fuel system is a fuel system between the first shutoff valve and the second shutoff valve, the second fuel system is a fuel system between the second shutoff valve and the fuel injection valve, the determination process determines a leakage anomaly in the first fuel system or the second fuel system based on a first magnitude relationship in a state in which the first fuel system is filled with gaseous fuel, or on a second magnitude relationship in a state in which the second fuel system is filled with gaseous fuel, the first magnitude relationship is a magnitude relationship between a detection value of the first pressure sensor and a predetermined first threshold value, and the second magnitude relationship is a magnitude relationship between a detection value of the second pressure sensor and a predetermined second threshold value.

2. The anomaly detection device for an internal combustion engine according to claim 1, wherein the first magnitude relationship is a magnitude relationship between an amount of change in the detection value of the first pressure sensor and the first threshold value, the second magnitude relationship is a magnitude relationship between an amount of change in the detection value of the second pressure sensor and the second threshold value, and the second threshold value is set such that a pressure range in which a pressure decrease relating to the second pressure sensor is determined to be free from anomaly is larger than a pressure range in which a pressure decrease relating to the first pressure sensor is determined to be free from anomaly.

3. The anomaly detection device for an internal combustion engine according to claim 1, wherein the first magnitude relationship is a magnitude relationship between a pressure value detected by the first pressure sensor after the first fuel system is filled with gaseous fuel and the first threshold value, the second magnitude relationship is a magnitude relationship between a pressure value detected by the second pressure sensor and the second threshold value, and the second threshold value is set such that a pressure range in which a pressure decrease relating to the second pressure sensor is determined to be free from anomaly is larger than a pressure range in which a pressure decrease relating to the first pressure sensor is determined to be free from anomaly.

4. The anomaly detection device for an internal combustion engine according to claim 1, wherein the first shutoff valve and the second shutoff valve are maintained in a closed state while the internal combustion engine is stopped, the control circuit is configured to perform a first filling process in response to a request for starting the internal combustion engine, the first filling process outputs an open command and a subsequent close command to the first shutoff valve to fill the first fuel system with gaseous fuel, and the determination process determines that the second shutoff valve has a leakage anomaly when the determination process detects a pressure decrease in the first fuel system based on the first magnitude relationship after completion of the first filling process, and the determination process detects an increase in a pressure detected by the second pressure sensor in response to the open command output to the first shutoff valve.

5. The anomaly detection device for an internal combustion engine according to claim 4, wherein the determination process determines that a section of the first fuel system that is upstream of the second shutoff valve has a leakage anomaly when a pressure decrease in the first fuel system is detected based on the first magnitude relationship after the first filling process is completed, and the determination process detects absence of increase in the pressure detected by the second pressure sensor in response to the open command output to the first shutoff valve.

6. The anomaly detection device for an internal combustion engine according to claim 4, wherein the control circuit is configured to, when the determination process does not detect a pressure decrease in the first fuel system based on the first magnitude relationship after completion of the first filling process, output an open command and a subsequent close command to the second shutoff valve to perform a second filling process that fills the second fuel system with gaseous fuel, and the determination process determines that a section of the second fuel system that is downstream of the second shutoff valve has a leakage anomaly when a pressure decrease in the second fuel system is detected based on the second magnitude relationship after completion of the second filling process.

7. The anomaly detection device for an internal combustion engine according to claim 1, wherein the first shutoff valve and the second shutoff valve are maintained in a closed state while the internal combustion engine is stopped, the control circuit is configured to perform a first filling process in response to a request for starting the internal combustion engine, the first filling process outputs an open command and a subsequent close command to the first shutoff valve to fill the first fuel system with gaseous fuel, and the determination process determines that a section of the first fuel system that is upstream of the second shutoff valve has a leakage anomaly when the determination process detects a pressure decrease in the first fuel system based on the first magnitude relationship after completion of the first filling process, and the determination process detects absence of increase in a pressure detected by the second pressure sensor in response to the open command output to the first shutoff valve.

8. The anomaly detection device for an internal combustion engine according to claim 1, wherein
the first shutoff valve and the second shutoff valve are maintained in a closed state while the internal combustion engine is stopped,
the control circuit is configured to perform a first filling process in response to a request for starting the internal combustion engine,
the first filling process outputs an open command and a subsequent close command to the first shutoff valve to fill the first fuel system with gaseous fuel,
the control circuit is configured to perform a second filling process when the determination process does not detect a pressure decrease in the first fuel system based on the first magnitude relationship after completion of the first filling process,
the second filling process outputs an open command and a subsequent close command to the second shutoff valve to fill the second fuel system with gaseous fuel, and
the determination process determines that a section of the second fuel system that is downstream of the second shutoff valve has a leakage anomaly when a pressure decrease in the second fuel system is detected based on the second magnitude relationship after completion of the second filling process.

9. The anomaly detection device for an internal combustion engine according to claim 1, wherein
the first shutoff valve and the second shutoff valve are maintained in a closed state while the internal combustion engine is stopped,
the first pressure sensor includes an upstream pressure sensor and a downstream pressure sensor,
the upstream pressure sensor is disposed in a section of the fuel passage between the first shutoff valve and the pressure reducing valve,
the downstream pressure sensor is disposed in a downstream first fuel system,
the downstream first fuel system is a section of the fuel passage between the pressure reducing valve and the second shutoff valve,
the control circuit is configured to perform a first filling process in response to a request for starting the internal combustion engine,
the first filling process outputs an open command and a subsequent close command to the first shutoff valve to fill the first fuel system with gaseous fuel, and
the determination process determines that a section of the first fuel system upstream of the pressure reducing valve has a leakage anomaly when
a pressure decrease in a section of the first fuel system between the first shutoff valve and the pressure reducing valve is detected based on a magnitude relationship between a detection value of the upstream pressure sensor after completion of the first filling process and the first threshold value, and
a pressure decrease in the downstream first fuel system is not detected based on a magnitude relationship between a detection value of the downstream pressure sensor and a predetermined third threshold value.

10. The anomaly detection device for an internal combustion engine according to claim 1, wherein
the first shutoff valve and the second shutoff valve are maintained in a closed state while the internal combustion engine is stopped,
the first pressure sensor includes an upstream pressure sensor and a downstream pressure sensor,
the upstream pressure sensor is disposed in a section of the fuel passage between the first shutoff valve and the pressure reducing valve,
the downstream pressure sensor is disposed in a downstream first fuel system,
the downstream first fuel system is a section of the fuel passage between the pressure reducing valve and the second shutoff valve,
the control circuit is configured to perform a first filling process in response to a request for starting the internal combustion engine,
the first filling process outputs an open command and a subsequent close command to the first shutoff valve to fill the first fuel system with gaseous fuel, and
the determination process determines that a section of the first fuel system downstream of the pressure reducing valve has a leakage anomaly when
the determination process detects a pressure decrease in a section of the first fuel system between the first shutoff valve and the pressure reducing valve based on a magnitude relationship between a detection value of the upstream pressure sensor after completion of the first filling process and the first threshold value,
the determination process detects a pressure decrease in the downstream first fuel system based on a magnitude relationship between a detection value of the downstream pressure sensor and a predetermined third threshold value, and
a pressure detected by the second pressure sensor does not increase in response to the open command output to the first shutoff valve.

11. The anomaly detection device for an internal combustion engine according to claim 1, wherein
the first shutoff valve and the second shutoff valve are maintained in an open state while the internal combustion engine is in operation,
the control circuit is configured to perform a first closing process of outputting a close command to the first shutoff valve in response to a request for stopping the internal combustion engine, and
the determination process determines that the first shutoff valve has a leakage anomaly when a pressure decrease is not detected in the first fuel system based on a magnitude relationship after the first closing process.

12. The anomaly detection device for an internal combustion engine according to claim 11, wherein
the control circuit is configured to output a close command to the second shutoff valve when the determination process detects a pressure decrease in the first fuel system based on the first magnitude relationship after a close command is output to the first shutoff valve, and
the determination process determines that the second shutoff valve has a leakage anomaly when a pressure decrease in the second fuel system is not detected based on the second magnitude relationship after the close command is output to the second shutoff valve.

13. The anomaly detection device for an internal combustion engine according to claim 1, wherein
the first shutoff valve and the second shutoff valve are maintained in an open state while the internal combustion engine is in operation,
the control circuit is configured to perform a second closing process in response to a request for stopping the internal combustion engine, the second closing process outputs a close command to the second shutoff valve, and the determination process determines that the second shutoff valve has a leakage anomaly when a pressure decrease is not detected in the second fuel system based on the second magnitude relationship after the second closing process.

14. The anomaly detection device for an internal combustion engine according to claim 1, wherein the first pressure sensor is disposed in a section of the fuel passage between the first shutoff valve and the pressure reducing valve.

15. The anomaly detection device for an internal combustion engine according to claim 1, wherein the first pressure sensor is disposed in a section of the fuel passage between the pressure reducing valve and the second shutoff valve.

16. An anomaly detection method for an internal combustion engine, comprising, with a control circuit:

filling a first fuel system with gaseous fuel;

filling a second fuel system with gaseous fuel, wherein
the internal combustion engine includes a fuel supply device,
the fuel supply device includes a tank that stores gaseous fuel, a fuel injection valve that supplies fuel to a cylinder, a fuel passage that supplies the gaseous fuel in the tank to the fuel injection valve, a first shutoff valve disposed downstream of the tank in the fuel passage, a pressure reducing valve disposed downstream of the first shutoff valve in the fuel passage, a second shutoff valve disposed downstream of the pressure reducing valve in the fuel passage, a first pressure sensor disposed in the first fuel system, and a second pressure sensor disposed in the second fuel system,
the first fuel system is a fuel system between the first shutoff valve and the second shutoff valve, and
the second fuel system is a fuel system between the second shutoff valve and the fuel injection valve;

determining a first magnitude relationship in a state in which the first fuel system is filled with gaseous fuel, the first magnitude relationship being a magnitude relationship between a detection value of the first pressure sensor and a predetermined first threshold value;

determining a second magnitude relationship in a state in which the second fuel system is filled with gaseous fuel, the second magnitude relationship being a magnitude relationship between a detection value of the second pressure sensor and a predetermined second threshold value; and determining a leakage anomaly in the first fuel system or the second fuel system based on the determination of the first magnitude relationship or the determination of the second magnitude relationship.

17. A non-transitory computer-readable storage medium storing a program for causing a processer to perform an anomaly detection process for an internal combustion engine, the anomaly detection process comprising:

filling a first fuel system with gaseous fuel;

filling a second fuel system with gaseous fuel, wherein
the internal combustion engine includes a fuel supply device,
the fuel supply device includes a tank that stores gaseous fuel, a fuel injection valve that supplies fuel to a cylinder, a fuel passage that supplies the gaseous fuel in the tank to the fuel injection valve, a first shutoff valve disposed downstream of the tank in the fuel passage, a pressure reducing valve disposed downstream of the first shutoff valve in the fuel passage, a second shutoff valve disposed downstream of the pressure reducing valve in the fuel passage, a first pressure sensor disposed in the first fuel system, and a second pressure sensor disposed in the second fuel system,
the first fuel system is a fuel system between the first shutoff valve and the second shutoff valve, and
the second fuel system is a fuel system between the second shutoff valve and the fuel injection valve;

determining a first magnitude relationship in a state in which the first fuel system is filled with gaseous fuel, the first magnitude relationship being a magnitude relationship between a detection value of the first pressure sensor and a predetermined first threshold value;

determining a second magnitude relationship in a state in which the second fuel system is filled with gaseous fuel, the second magnitude relationship being a magnitude relationship between a detection value of the second pressure sensor and a predetermined second threshold value; and determining a leakage anomaly in the first fuel system or the second fuel system based on the determination of the first magnitude relationship or the determination of the second magnitude relationship.

\* \* \* \* \*